United States Patent Office 3,313,188
Patented Apr. 11, 1967

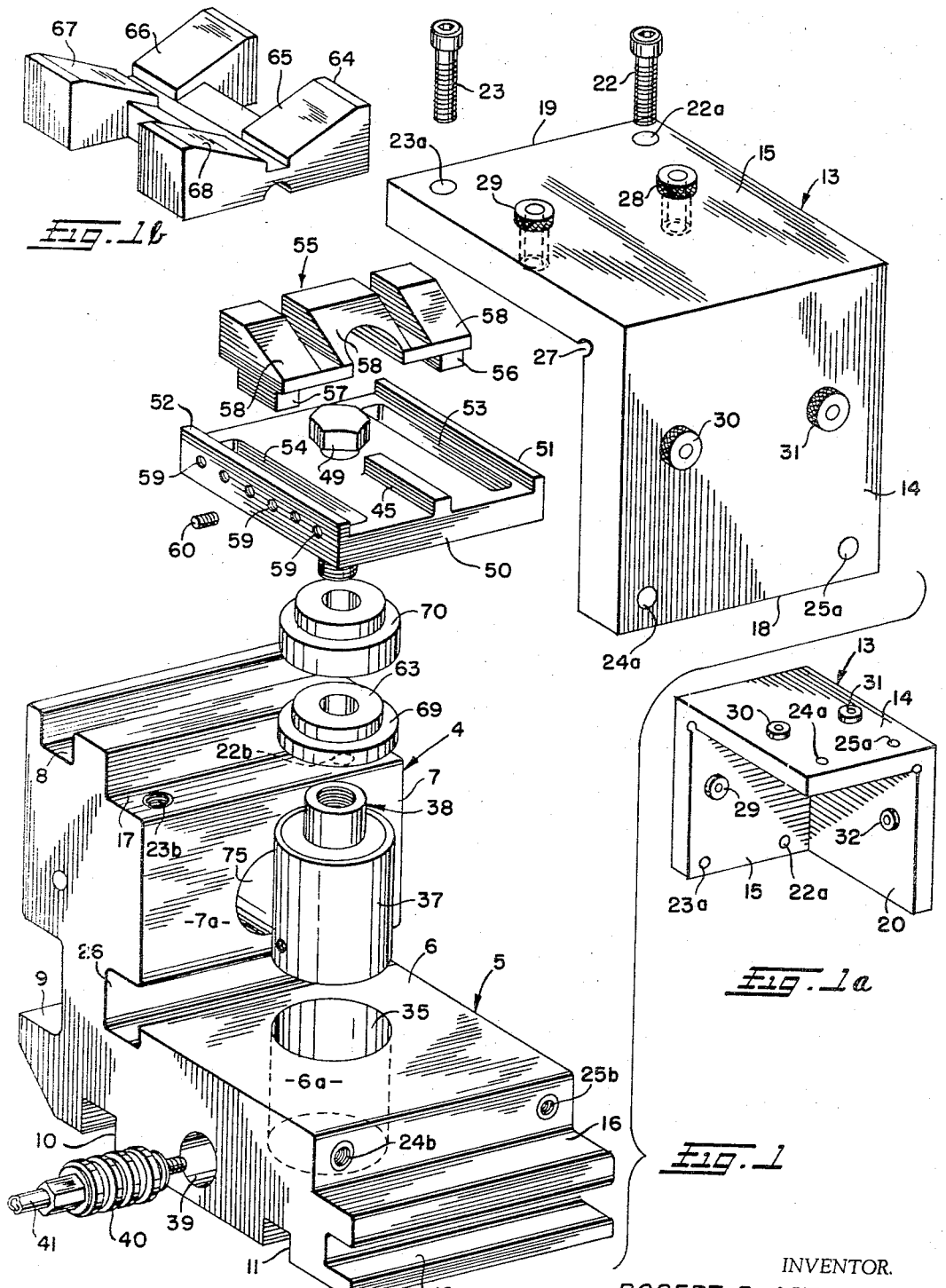

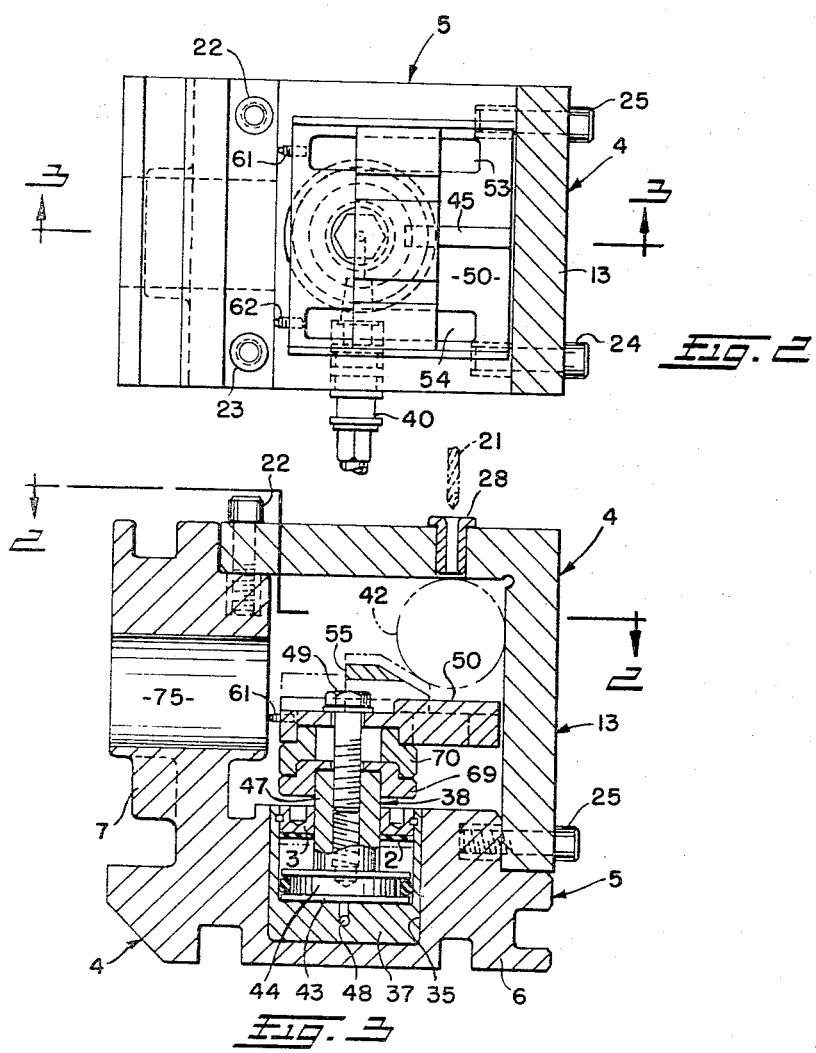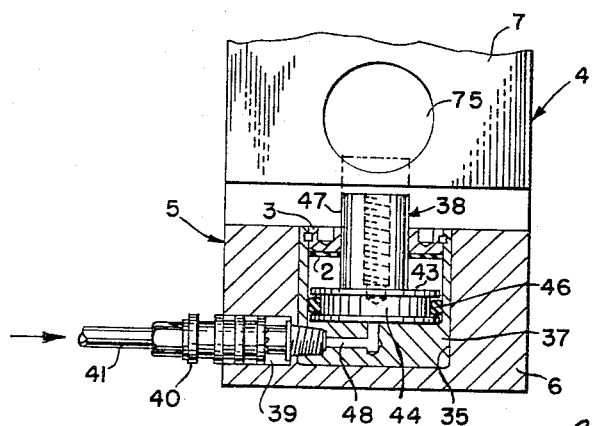

3,313,188
MULTI-PLANE DRILL JIG VISE
Robert R. Abernethy, 240 Logan Ave.,
Bedford, Ohio 44014
Filed Nov. 3, 1964, Ser. No. 408,522
8 Claims. (Cl. 77—62)

This invention relates to a jig used with a drill press and more particularly to a much improved multi-plane drill jig.

A jig may be defined as a device used in the manufacture of duplicate parts of machines, and is intended to make possible, interchangeable work at a reduced cost as compared with the cost of producing each machine detail individually. In the case of a drill jig, the jig is used as a guide to bore similar holes, similarly located in a number of parts which are substantially similar, only varying in size by the tolerances set forth in making them. Drill jigs serve the purpose of holding and properly locating a workpiece while it is being drilled upon.

To accomplish this, the jig is provided with a means for clamping the workpiece within the jig. Also provided is a bushing plate which is secured to the jig, and, in which, are drill bushings for guiding the drill into the workpiece. All the work produced in the same jig will be alike in all respects; "alike" implying simply that the holes drilled will be near enough alike for the purpose for which the work is intended.

Many drill jigs presently used, have bushing plates secured thereto, which permit drilling upon the workpiece in only one plane. Also, these drill jigs utilize a V-shaped block into which the workpiece is placed and clamped within the drill jig. This invention is characterized by a drill jig with interchangeable bushing plates, which permits drilling in 1, 2 and 3 planes. To accomplish this, a new manner for positioning the workpiece within the jig is provided.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

In the annexed drawings:

FIG. 1 is an exploded isometric view of an embodiment of the drill jig.

FIG. 1a is an isometric view of a bushing plate which may be alternately used with the drill jig of FIG. 1.

FIG. 1b is an isometric view of a V-block which may be alternately used with the drill jig of FIG. 1.

FIG. 2 is a top sectional view of the drill jig of FIG. 1 taken in the plane indicated by the line 2—2 of FIG. 3.

FIG. 3 is a cross sectional view of the drill jig of FIG. 1 taken in the plane indicated by the line 3—3 of FIG. 2.

FIG. 4 is a cross sectional view of the piston arrangement in the base of the drill jig of FIG. 1.

Briefly stated this invention is a drill jig for holding a workpiece. In accordance herewith there is provided a base which is preferably L-shaped. A bushing plate for guiding a drill is secured to the base, the plate being preferably L-shaped, and having its marginal edges secured to the base so that the right angular corner formed by the sides of the bushing plate is diagonally opposed to the right angular corner formed by the sides of the base. The bushing plate, just described, permits drilling upon the workpiece in one or two planes. A bushing plate having a third side which lies in a plane perpendicular to the planes of the other two sides is interchangeable with the other bushing plate. The workpiece can then be drilled upon in three planes.

A piston, reciprocable in the base, is designed to move the workpiece toward the bushing plate. Secured to the piston is a platform on which the workpiece is supported. Slidably mounted on the platform is an adjustable wedge block, including an inclined plane, which is adjustable on the platform to compensate for workpieces having variable shapes and diameters. When the workpiece is placed on the platform against the inclined plane and the piston is moved in a direction towards the bushing plate, the workpiece is wedged into the corner of the bushing plate. A V-shaped wedge block may alternately be supported on the platform. The workpieces are mounted atop the V-shaped wedge block and wedged against the bushing plate as the piston moves in that direction.

In the other side or leg of the jig is an adjustable collet which is slidably and rotatably mounted in a bushing selectively rotatable in a bore in the leg. Different size adjustable collets may be used to clamp workpieces of different sizes or diameters in the drill jig. A bushing plate is secured to the jig along its marginal edge adjacent the collet. The bushing plate has a stepped down drilling plane, whereby the plane is relatively close to the workpiece clamped in the collet.

Referring to FIGS. 1–4 of the annexed drawings, there is shown a drill jig generally indicated at 4. The jig 4 has a base, generally indicated at 5. Preferably, the jig base 5 is L-shaped having a base or bottom portion 6 and an upstanding leg portion 7 secured thereto. The portions 6 and 7 are disposed at right angles to each other. The jig base 5 has therein, a plurality of recesses, for example, recesses 8, 9, 10, 11 and 12. The recesses are used to clamp the drill jig 5 on the working plate of a conventionally designed drill press.

A bushing plate, generally indicated at 13, is secured to the drill jig base 5. The bushing plate 13 is designed so that its sides form at least one right angular corner. In this particular embodiment of the invention, the bushing plate has an L-shaped configuration formed by sides 14 and 15. Recesses 16 and 17 in the marginal edges of the jig base 5 are designed to receive and position the corresponding marginal edges 18 and 19, respectively, of the bushing plate 13. When the bushing plate 13 is positioned on the jig base 5, the right angular corner formed between the abutting sides 14 and 15 is diagonally opposed to the right angular corner formed in the drill jig base 5.

The bushing plate 13 is secured to, and positioned in the recesses 16 and 17 by aligning and fastening pins e.g. dowel pins 22, 23, 24, and 25, which are inserted through corresponding holes 22a, 23a, 24a and 25a of the bushing plate 13, and threadably secured in corresponding holes 22b, 23b, 24b, and 25b in the jig base 5. When the bushing plate 13 is secured to the jig base 5, the sides 14 and 15 of the bushing plate 13 are parallel to the base portion 6 and leg 7, respectively, of the jig base 5. To keep material from building up in the right angular corner formed in the bushing plate 13, a recess 27 is cast or formed therein. Recess 26 is provided to facilitate grinding the surfaces 6a and 7a of base portion 6 and leg 7, respectively.

The bushing plate 13 of FIG. 1 is used in combination with the jig base 5, when it is desired to drill holes in the workpiece from one or two planes. A third side 20, perpendicular to sides 14 and 15, may be added to the bushing plate 13, in order to provide drilling upon the workpiece in three planes. This particular embodiment of the bushing plate 13 is shown in FIG. 1a. The side 20 is secured to, and integral with, the sides 14 and 15 of the bushing plate 13. For purposes of illustration, the bushing plate 13 has been rotated 90° to show, more clearly, side 20. As seen in FIGS. 1 and 1a, a drill bushing or a plurality of drill bushings may be placed in the sides of the bushing plate 13, e.g. drill bushings 28 and 29, 30, 31, and 32. The drill bushings are used to guide a drill, e.g. drill 21 (FIG. 3), into the workpiece.

The bottom base portion 6 has a centrally disposed bore 35 extending therein from its working surface 6a. A cylinder 37 is secured within the bore 35. A piston 38 is reciprocable in the cylinder 37. The base portion 6 has an opening 39 therein, which communicates with the inside of the cylinder 37 through passageway 48 (FIG. 4). A conventionally designed fluid pressure valve 40 is inserted in the opening 39, and regulates the fluid pressure within the cylinder 37.

Although the means for raising and lowering the workpiece to and from the bushing plate 13, is described in terms of a reciprocating piston, it should be understood that any mechanical means may be used, e.g., a screw jack (not shown).

The piston 38 has a circular disc portion 43 (FIG. 4) having a smaller diameter than the inside diameter of the cylinder 37. The disc portion 43 has formed therein, a circumferential recess 44, in which lies an O-type sealer ring 46 for sealing the space between the disc portion 43 and the walls of the cylinder 37. A cylindrical portion 47 is mounted atop the disc portion 43 and integral therewith. The cylindrical portion 47 protrudes from the cylinder 37.

In operation, air or oil under pressure, is forced from the line 41 through the valve 40 into the passageway 48 and into the cylinder 37. The fluid pressure forces the piston 38 to move in a direction towards the bushing plate 13 and away from the surface 6a. An annular resilient gasket or stop 2, preferably rubber, is located in the cylinder 37 adjacent its head 3, coacts with the disc portion 43 to facilitate reciprocating movement of the piston 38.

A platform 50 is secured to the piston 38 by any suitable fastening means, e.g. bolt 49. The platform 50 has a pair of oppositely disposed marginal edges built up to form guide rails 51 and 52. The rails 51 and 52 also provide drill clearance between a workpiece supported thereon and the platform 50. A center rail 45, intermediate rails 51 and 52, may be provided on the platform 50 to support smaller workpieces. Adjacent the guide rails 51 and 52, respectively, and substantially coextensive therewith, are recesses 53 and 54 in platform 50. Spring biased ball dents 61 and 62 in the edge of the platform 50, coact with the adjacent surface 7a of the leg 7 to prevent rotary movement of the platform 50.

A wedge block generally indicated at 55, is slidably mounted on the platform 50. The wedge block 55 is mounted atop the platform 50, between the guide rails 51 and 52, and coacts with the platform 50 to support a workpiece, e.g. workpiece 42 (in dotted outline). The wedge block 55 has extending therefrom, a pair of spaced rails 56 and 57, which fit into the recesses 53 and 54, respectively, and are slidable therealong. The wedge block 55 has formed thereon a sloped surface 58, preferably interrupted as shown, which forces a workpiece into the corner former in the bushing plate 13 as the platform 50 is moved in a direction theretowards.

A plurality of holes e.g. holes 59, are tapped in the sides of the platform adjacent the recesses 53 and 54. Set screws, e.g. set screw 60, are threadably inserted in the tapped holes and engage the side of the wedge block 55 to secure it upon the platform 50, after its position thereon has been predetermined by the size or diameter of the workpiece.

The V-shaped wedge block 64 as seen in FIG. 1b, is also designed to be supported upon the platform 50 within the side rails 51 and 52. When this particular embodiment of the wedge block is used, the workpiece is supported on the inclinded surfaces 65, 66, 67 and 68 of the block 64. As the piston 38 is raised, it wedges the workpiece between the surfaces 65, 66, 67 and 68 and the bushing plate 13.

The platform 50 may be used in combination with either of the wedge blocks, or alone. For example, when the workpiece is a piece of flat stock, e.g a piece having a rectangular cross section, the workpiece may be supported directly on the rails 51, 45 and 52 extending from the platform 50, and wedged thereon against the bushing plate 13, as the piston 38 is moved theretowards. In cases where the workpieces are relatively small, the stroke of the piston may be such that proper wedging action cannot be supplied. In such cases, the piston head 47 is extended by adding extension collars, such as collars 69 and 70 thereto, to provide the proper wedging action. A workpiece having a bore therein, may be supported on a collar by forming the hub of the collar, e.g. hub 63 of collar 69, to fit within the bore. The workpiece is placed on the collar and wedged against the bushing plate 13.

Thus, there has been provided a new and novel drill jig for holding a workpiece placed therein. The drill jig is designed to permit drilling upon the workpiece in one, two and three planes, and is characterized by a new and novel manner for clamping a workpiece by wedging it in a corner. Many different shapes and sizes of workpieces are readily clamped therein.

Other modes of applying the principle of this invention may be employed instead of those specifically set forther above, changes being made as regards the details herein disclosed, provided the elements set forth in any of the following claims, or the equivalent of such be employed.

It is, therefore, particularly pointed out and distinctly claimed as the invention:

1. A drill jig for holding a workpiece, comprising:
   (a) a base;
   (b) a bushing plate secured to the base, having at least two sides which form a right angular corner therebetween, the plate designed to guide a drill into the workpiece from at least two planes; and
   (c) means secured to the base and movable therefrom, for wedging the workpiece into the corner of the bushing plate.

2. The drill jig of claim 1, wherein the corner formed in the bushing plate is in opposed relation to the base.

3. The drill jig of claim 2, wherein the wedging means (c) includes:
   (d) means for supporting the workpiece, disposed between the base and corner and movable in a direction to and from the corner;
   (e) means coacting with the support means (d) for directing the workpiece into the corner as the support means moves theretowards; and
   (f) means coacting with the base for moving the support means to and from the corner.

4. The drill jig of claim 3, wherein the directing means (e) includes:
   (g) a wedge block with a sloped surface for engaging the workpiece; and
   (h) means for adjustably positioning the wedge block on the supporting means (d) to accommodate differently sized workpieces.

5. A drill jig for holding a workpiece comprising:
   (a) an L-shaped base having a bottom portion and an upstanding leg portion secured thereto, the portions having a right angular corner formed therebetween;
   (b) an L-shaped bushing plate whose sides form a right angular corner therebetween, the free marginal edges of the plate being secured to the corresponding free marginal edges of the base, the corner formed in the plate being diagonally opposed to the corner formed in the base;
   (c) a platform for supporting the workpiece, disposed between the bottom portion of the base and the opposite side of the bushing plate, and movable therebetween;
   (d) means coacting between the bottom portion of the base and the platform for moving the platform, whereby the workpiece supported thereon is raised and lowered from the corner formed in the bushing plate; and (e) means on the platform coacting with the workpiece supported thereon, for wedging the workpiece into the corner of the bushing plate as the platform is raised towards the corner, whereby the workpiece is clamped in the jig adjacent the corner to permit drilling thereon in at least two planes.

6. The drill jig of claim 5, wherein the means (e) for wedging includes:

(f) a wedge block slidably mounted on the platform, the block having an inclined surface for wedging coaction against the workpiece; and (g) means for positioning the wedge block on the platform to accommodate workpieces of varying sizes.

7. The drill jig of claim 6, wherein the means (d) for moving includes:

(h) a piston mounted for reciprocating in the bottom portion of the base, the piston having a portion thereof protruding from the bottom portion and secured to the platform; and (i) means for reciprocating the piston.

8. The drill jig of claim 7, wherein the bushing plate includes another side secured thereto and integral therewith, which side is disposed at right angles to the other two sides to permit drilling upon the workpiece in three planes.

References Cited by the Examiner
UNITED STATES PATENTS

| | | | |
|---|---|---|---|
| 1,529,557 | 3/1925 | Simon | 77—62 |
| 2,749,781 | 6/1956 | Herzl | 77—62 |

OTHER REFERENCES

American Machinist, page 325, dated February 16, 1911, article entitled "Standard Drilling and Reaming Jig."

FRANCIS S. HUSAR, *Primary Examiner.*